March 29, 1960        K. WÜST        2,930,818
PROCESS FOR THE PURIFICATION OF 1,1,1-TRIMETHYLOL PROPANE
Filed April 14, 1958
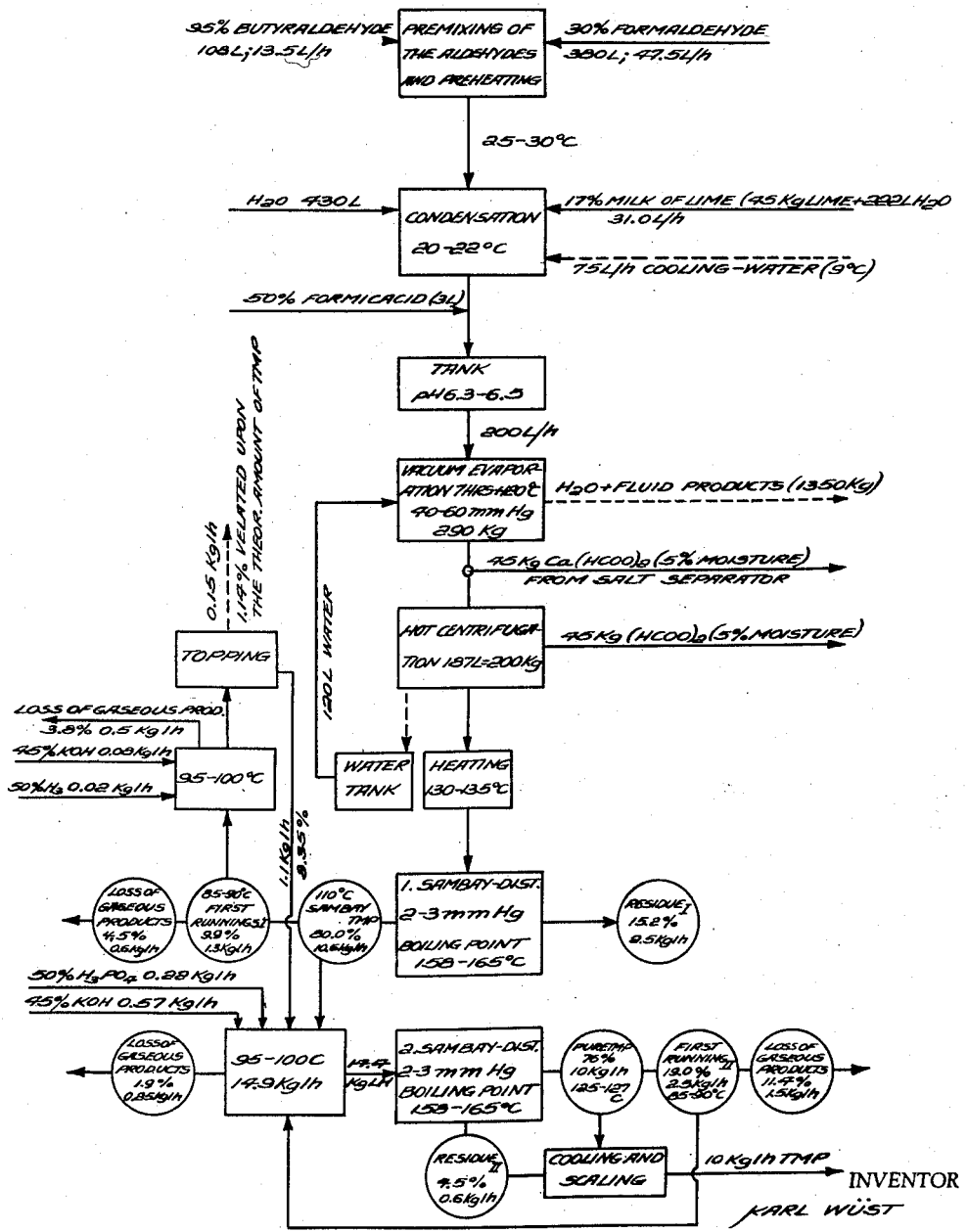

ced Mar. 29, 1960

2,930,818
PROCESS FOR THE PURIFICATION OF 1,1,1-TRIMETHYLOL PROPANE

Karl Wüst, Hanau (Main), Germany, assignor to Deutsche Gold- und Silber-Scheideanstalt vormals Roessler, Frankfurt am Main, Germany Application April 14, 1958, Serial No. 728,376

Claims priority, application Germany April 17, 1957

4 Claims. (Cl. 260—637)

The present invention relates to an improved process for the purification of 1,1,1-trimethylol alkanes containing at least six carbon atoms.

1,1,1-trimethylol alkanes are assuming increasing importance in the synthetic resin industry, for example, as polyester components. 1,1,1-trimethylol alkanes containing at least six carbon atoms, for example, have been produced by condensation of aldehydes containing at least four carbon atoms, such as butyraldehyde with formaldehyde in an alkaline medium, for example, in the presence of calcium hydroxide. The crude products thus obtained, however, are considerably contaminated with other condensation products of the aldehydes, unsaturated aldehydes, formals and esters. Such contaminated products are not suitable as polyester components.

It has already been proposed that such crude products be purified by a recrystallization from esters.

According to the invention it was found that very pure 1,1,1-trimethylol alkanes can easily be obtained by adding alkaline reacting materials such as alkali hydroxides, preferably potassium hydroxide or sodium hydroxide to the crude product, such as, for example, of 1,1,1-trimethylol propane, to adjust its pH to 6.0 to 7.5, then heating it to 50 to 250° C., preferably 95 to 100° C., for a period of from 30 to 120 minutes and then after adjusting the pH to 4 to 5 by addition of an acid, preferably a substantially non-volatile inorganic acid, such as phosphoric acid or sulfuric acid, subjecting it to a film-distillation (Sambay distillation). The pH values referred to are measured with Lyphan paper.

It was furthermore found that the purification of 1,1,1-trimethylol alkanes, for example, 1,1,1-trimethylol propane, can be carried out more easily when crude 1,1,1-trimethylol alkanes are employed as starting materials which have been freed of water and salts. Such water and salt free crude products can easily be obtained in a known manner by adjusting the pH of the crude condensation solution by the addition of an organic acid, expediently formic acid or oxalic acid, to such a value that condensation of the unsaturated products to highly condensed compounds is avoided while it is boiled down to produce a water free melt and removing the suspended salt (Ca formate) from the water free melt by filtering or centrifuging. It is expedient to maintain a temperature of 80 to 130° when the water is evaporated off and during filtration of the melt, and to separate off a portion of the salt formed (Ca formate) during the evaporation with the aid of a salt separator provided below the evaporator.

It was also found that the purification process according to the invention is further improved when the crude 1,1,1-trimethylol alkane is subjected to a vacuum thin film distillation before addition of the alkaline reacting substance and the vapors going over are partially condensed in two heated condensers. In some cases it is useful to heat the crude 1,1,1-trimethylol alkane before it is subjected to the vacuum thin film distillation for about 60 minutes at 130 to 135° C.

It was found that the process according to the invention renders it possible to remove the esters and formals which are contained in considerable quantities in the crude 1,1,1-trimethylol alkane and normally cannot be separated therefrom by distillation. The purified 1,1,1-trimethylol alkane, for example, 1,1,1-trimethylol propane, which is produced in the form of a melt can be crystallized without difficulty on cooled rolls and be scaled off therefrom. The properties of the product obtained indicate that it is practically pure. The process according to the invention is inexpensive and produces good yields of trimethylol alkanes, for example, 76% of theoretical based on butyraldehyde in the case of 1,1,1-trimethylol propane, as the first runnings of the distillation are recycled and as the trimethylol alkane bound as formals and esters can be recovered.

The following examples illustrate several embodiments of the process according to the invention. The series of the reaction steps are the same as shown in the flow sheet of Example 3.

Example 1

648 liters of 95% butyraldehyde, 2340 liters of formaldehyde and 279 kg. of lime (in the form of 17% milk of lime) were run into 2580 liters of water in six charges for every eight hours' reaction time with intensive stirring while maintaining a temperature of 20–22° C. Subsequent to an after reaction period of one hour, a sufficient quantity of formic acid was added to the condensation solution to adjust its pH to 6.4 and it was then subjected to vacuum evaporation under a pressure of 40–60 mm. Hg to produce 934 liters of crude 1,1,1-trimethylol propane and 449 kg. of calcium formate (the latter after isolation by centrifuging still contained about 5% of moisture). The centrifuged crude 1,1,1-trimethylol propane thus obtained was subjected to a vacuum thin film distillation at a pressure of 2–3 mm. Hg to obtain 649 kg. of crude 1,1,1-trimethylol propane, 84 kg. of first runnings (I) and 144 kg. of distillation residue. The loss in gaseous products was 124 kg. The thus obtained crude 1,1,1-trimethylol propane was combined with first runnings (II) obtained in the subsequent thin film distillation and heated with a sufficient quantity of 45% caustic potash solution to adjust the pH between 6.5 and 7 for 75 minutes at 95 to 100° C. Thereafter a sufficient quantity of 50% phosphoric acid was added to adjust the pH to 4.3. First runnings (I) were also given the same treatment and then after topping were combined with the still impure 1,1,1-trimethylol propane and the first runnings (II).

The thus obtained product was then subjected to a further thin film distillation with partial liquefication at a pressure of 2–3 mm. Hg in such a manner that about 25% of first runnings II are branched off. 660 kg. of pure trimethylol propane were obtained which corresponds to a 71% of the theoretical yield based upon butyraldehyde.

Example 2

5 x 108 liters of 95% butyraldehyde and 5 x 380 liters of 30% formaldehyde were premixed in a vibromixer and run in five charges with 5 x 46.5 kg. of lime (in the form of 17% milk of lime) into 430 liters of water provided for each charge in 8 hours. A reaction temperature of 20–22° C. was maintained. Subsequent to an after reaction period of one hour, formic acid was added to the reaction mixture, analogously to Example 1, and then processed analogously to Example 1. 595 kg. of pure 1,1,1-trimethylol propane were obtained corresponding to a 76% of the theoretical yield based upon butyraldehyde. The purification achieved can be seen from the following values obtained for the various 1,1,1-trimethylol propane products.

|  | | Saponification No. | Acid No. | Ester No. | M.P. |
|---|---|---|---|---|---|
| One thin film distilled crude 1,1,1-trimethylol propane. | (a) | 21.7 | 0.45 | 21.55 | 49–51°. |
|  | (b) | 21.1 | 0.44 | 19.66 | 51–53°. |
| First runnings I thereof | (a) | 45.0 | 3.2 | 41.8 | Liq. at room Temp. |
|  | (b) | 45.41 | 2.13 | 38.28 | Do. |
| After addition of base and acid, heating and second thin film distillation. | (a) | 3.9 | 0.1 | 3.8 | 58–59°. |
|  | (b) | 5.3 | 0.1 | 5.2 | 58–59°. |
| First runnings II | (b) | 9.5 | 0.2 | 9.3 |  |

*Example 3*

This example illustrates by means of a flow sheet a continuous purification process.

I claim:

1. A process for the purification of crude 1,1,1-trimethylol propane obtained by condensation of butyraldehyde with formaldehyde in an aqueous medium in the presence of calcium hydroxide, acidification of the reaction mixture with formic acid, concentration of the acidified reaction mixture and separation of the salt thus formed which comprises adding an alkali metal hydroxide solution to the crude product to provide a pH value of 6.0 to 7.5, then heating it to a temperature of 50 to 250° C., thereafter adjusting the pH thereof to 4.0–5.0 with a substantially non-volatile inorganic acid and subjecting the mixture to vacuum thin film distillation.

2. The process of claim 1 in which said heat treatment is at a temperature between 95 and 100° C. for a period of 30 to 120 minutes.

3. The process of claim 1 in which said crude product is vacuum distilled before adjusting its pH to 6.0 to 7.5 and heating to 50 to 250° C.

4. A process for the purification of crude 1,1,1-trimethylol propane obtained by condensation of butyraldehyde with formaldehyde in an aqueous medium in the presence of calcium hydroxide, acidification of the reaction mixture with formic acid, evaporation of the water and separation of the calcium formate thus formed from the melted product from which the water has been removed which comprises adding an alkali metal hydroxide solution to the crude product to provide a pH value of 6.0 to 7.5, then heating it to a temperature of 95 to 100° C., thereafter adjusting the pH thereof to 4.0–5.0 with a substantially non-volatile inorganic acid and subjecting the mixture to vacuum thin film distillation.

References Cited in the file of this patent

FOREIGN PATENTS

| 709,576 | Great Britain | May 26, 1954 |
| 1,107,899 | France | Aug. 17, 1955 |